Figure 1:
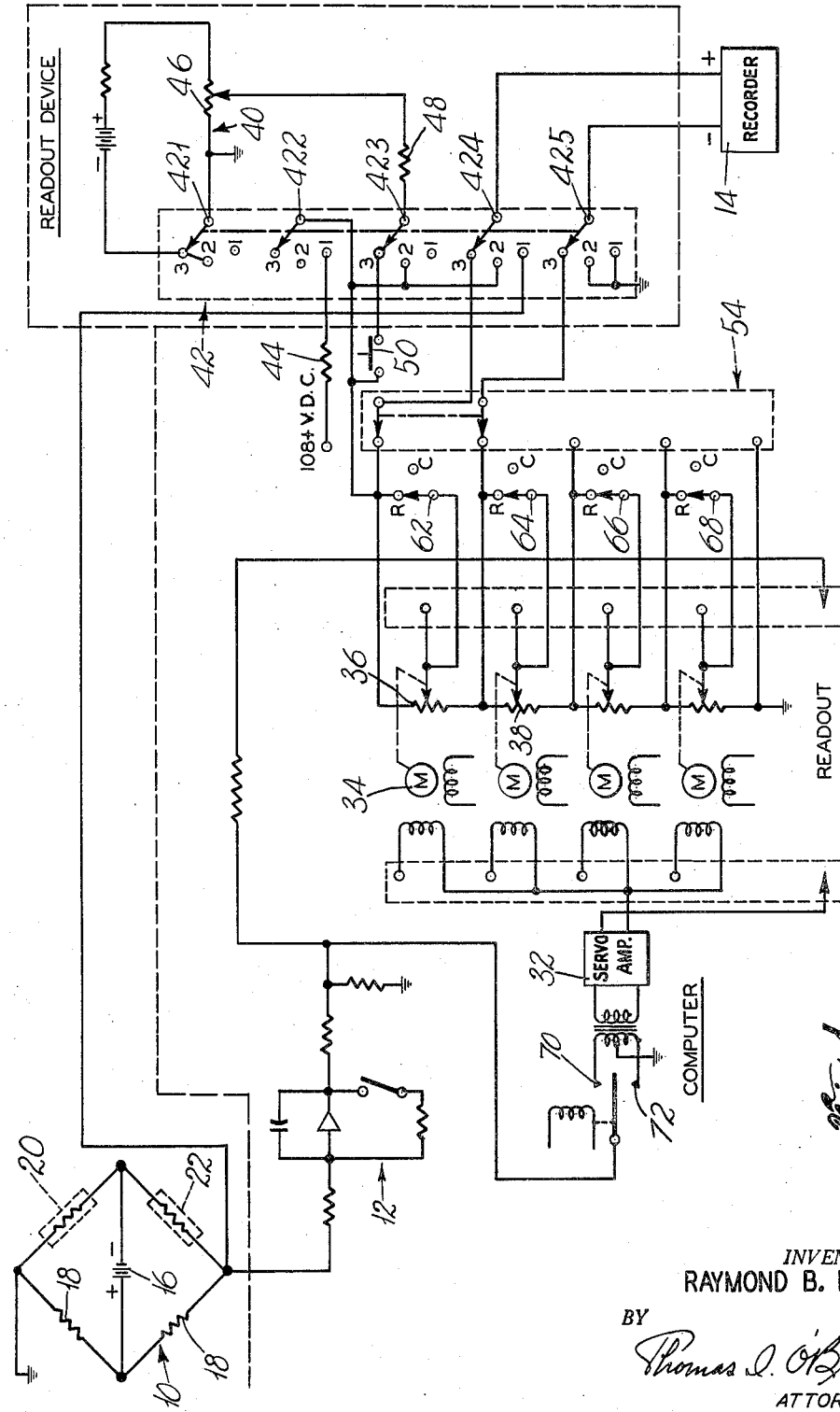

June 12, 1962 — R. B. FERTIG — 3,038,662
INTEGRATOR READOUT DEVICE
Filed Sept. 26, 1958 — 2 Sheets-Sheet 1

INVENTOR.
RAYMOND B. FERTIG
BY Thomas J. O'Brien
ATTORNEY

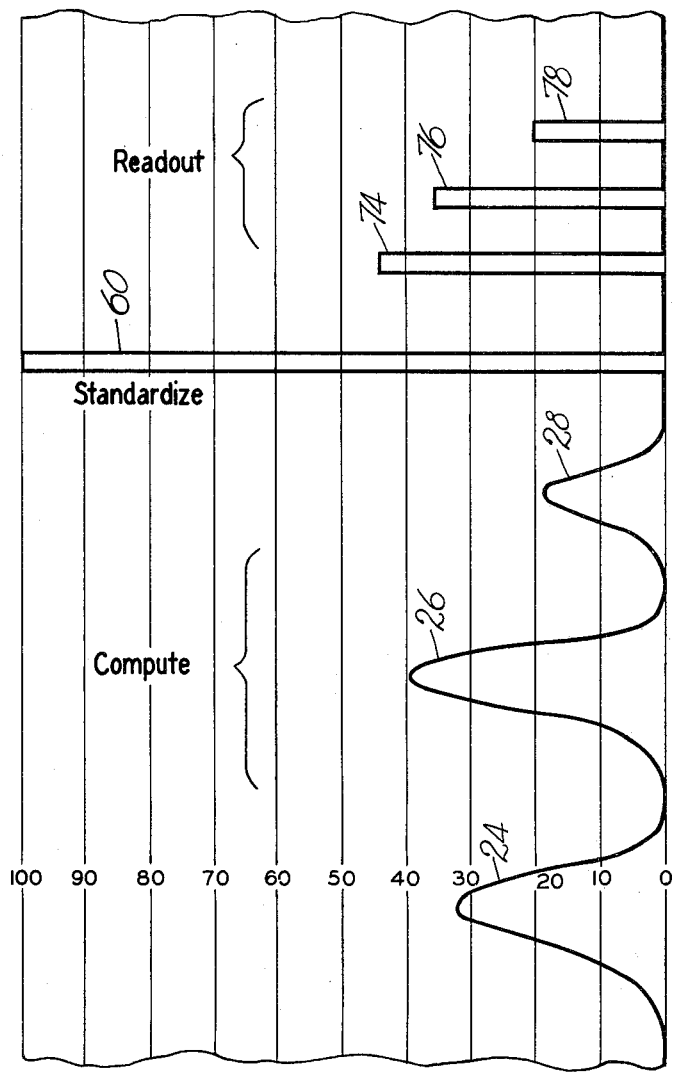

United States Patent Office 3,038,662
Patented June 12, 1962

3,038,662
INTEGRATOR READOUT DEVICE
Raymond B. Fertig, St. Albans, W. Va., assignor to Union Carbide Corporation, a corporation of New York
Filed Sept. 26, 1958, Ser. No. 763,698
1 Claim. (Cl. 235—196)

The invention relates to a method and apparatus for recording the data from an integrator or computer associated with electrical measuring apparatus.

The vapor phase chromatographic analyzer is one of the most important analytical instruments presently available for the quantitative measurement of the individual components of a multi-component gas sample. Such analyzers inject an inert carrier gas and a measured quantity of sample gas into a column packed with a material which separates the components. The components then elute separately from the column as binary mixtures with the carrier gas. The thermal characteristics of each such binary mixture are then compared with the thermal characteristics of the carrier gas. This comparison measurement is normally accomplished by the use of a bridge-type circuit and the output of the circuit utilized to actuate a recorder. The output of the recorder thus becomes a series of isolated peaks, each peak representing the amount of a particular component in the sample gas.

It can readily be understood that, while the chart of the recorder output will give a good graphical indication of the quantity of each component, the area under each recorded peak must be integrated to derive a true quantitative measurement. Integration is also desirable for calibration purposes if it is desired to stop the recorder chart motion during the elution of each component in order to give a bargraph output.

Several integrating systems are available for use with the chromatographic analyzer but one such type is an instrument which, by means of an integrating amplifier and servomotors, expresses the area under each peak as a potentiometer setting. The computer then switches these potentiometers into electrical series relationship and applies a reference voltage across the series combination. A ratio-reading voltmeter is then applied to external terminals provided on the computer so that the total series voltage is impressed across one set of input terminals while the other set of input terminals is connected across a "readout switch" in the integrator. The "readout switch" then measures the voltage across each potentiometer in turn so that the voltmeter reads each voltage as a percentage of the total. The percentage so read is in each case the same percentage as that of each gas component to the total sample.

While the computer as described is basically sound in theory and successful in operation, the ratio-reading voltmeter is a very expensive device. Further, the output is not recorded and the integrator is not easily adaptable to automatic programming.

It is, therefore, the primary object of the present invention to provide a simple inexpensive system for measuring the output of a computer.

Further objects, features, and advantages are to provide such a system capable of indicating the output in recorded form; and to provide such a system easily adaptable to automatic programming.

The above objects are accomplishing by providing an electrical measuring circuit and an electrical computer having a plurality of variable resistance information storing means and, in combination therewith, power supply means for applying voltage across the series combination of the resistors; a voltage recorder; and electrical switching means for connecting the recorder across at least one of the resistors.

The invention may be more readily explained by reference to the embodiment illustrated by the attached drawings wherein FIG. 1 is a schematic diagram of a chromatographic computer, bridge, and readout device in the readout position; and FIG. 2 illustrates a section of recorder chart.

With particular reference to FIG. 1, the Wheatstone bridge measuring circuit 10 of a chromatographic analyzer is shown with its output supplying an integrating amplifier circuit 12 and five pole, three position switch 42. The Wheatstone bridge 10 comprises power supply 16, fixed resistances 18, and thermistor elements 20 and 22 which are, respectively, the reference and measuring cell of a vapor phase chromatographic analyzer. Recorder 14 is connected across poles 424 and 425 of switch 42. Millivoltage source 40 is connected across poles 421 and 423 of switch 42 through limiting resistor 48.

During the normal integrating cycle, switches 62, 64, 66 and 68 within the computer are in the "compute" (or "C") position and each pole of switch 42 is in position 1. As a particular gas component elutes from the sample column, the bridge output voltage builds up from a "zero" or reference level to a peak value and then subsides. The peaks are recorded by recorder 14 and are shown in FIG. 2 as the concentration curves 24, 26, and 28 of gas components A, B, and C respectively. The amplitude of a peak at any given instant is a function of elution time. As will be understood, the total volume of the measured gas component is a function of the area under the curve. The varying voltage output of bridge 10 changes the voltage output of integrating amplifier 12 and by means of vibrator switch 70 and servo amplifier 32 causes servo motor 34 to adjust potentiometer 36 to a setting equivalent to the output voltage of integrating amplifier 12. It can thus be seen that the final resistance setting of potentiometer 36 is proportional to the area under curve 24 and to the total volume of gas component A. By suitable switching arrangements, the integration cycle is repeated for component B the information being stored in potentiometer 38. When the analysis of all components is complete, it will be seen that the volume of each component of the gas mixture will be represented by an equivalent potentiometer setting. After completion of the integration cycle, switches 62, 64, 66, and 68 are switched to the "R" position shown in FIG. 1 for purposes of readout.

The same recorder 14 is used for readout purposes as was used for recording component peaks. When switch 42 is in the first position, it will be noted that pole 422 maintains the circuit between the integrator reference voltage terminal through current limiting resistor 44 to the information-storing potentiometers. Poles 424 and 425 complete the circuit from the output of bridge 10 to recorder 14. In this position of the five-pole switch 42 is will be seen that recorder 14 is merely performing the normal functions of a recorder on a chromatographic analyzer.

When the computer has completed its function of storing information, switch 42 is switched into the second or "standardize" position. Reference to FIG. 1 will show that, in the standardize position, pole 422 is open-circuited. All other poles are in closed circuit position. Poles 424 and 425 function to place recorder 14 in electrical parallel relationship with the series circuit comprising potentiometers 36, 38, etc. Pole 423 applies a selected voltage through current limiting resistor 48 across both the readout potentiometers and the recorder. Standardizing potentiometer 46 is then adjusted until the voltage applied across the readout potentiometer and the recorder is such as to give a desired deflection on recorder 14. This desired deflection would most commonly be a full scale reading.

When the standardizing step has been completed, switch 42 is turned to the third or "readout" position. It will be noted that pole 421 is wired in such a manner that circuit 40 is still supplying the same voltage to pole 423. Pole 422 is open-circuited but pole 423 now applies the standarized voltage to push button 50. Poles 424 and 425 connect recorder 14 to integrator readout switch 54. To begin the actual readout sequence, push button 50 is depressed to apply the standarized voltage across all the readout potentiometers. With readout switch 54 in the position illustrated, recorder 14 will have impressed upon it the voltage drop across the unshunted portion of potentiometer 36. This voltage drop bears the same relationship to the standardized voltage as the volume of gas component A bore to the sum of all the measured components. Recorder 14 thus makes a visual trace which bears a similar proportion to the trace of the standardized voltage originally recorded. Thus, if the standardized voltage was recorded as 100 units, the component reading would be recorded directly as a percentage.

After the first component is recorded, computer readout switch 54 assumes a new position whereby the recorder 14 is connected across the unshunted portion of potentiometer 38. The sequence continues in this fashion until each component has been "read out" and recorded.

FIG. 2 illustrates the manner in which recorder 14 records the integrated values. Curves 24, 26, and 28 are the curves recorded during the elution of the respective components A, B, and C from the sample columns. While these curves are being recorded, the integrator is adjusting readout potentiometers 36, 38, etc. proportionally to the area under each curve. When switch 42 is placed in the "standardize" position, potentiometer 46 is adjusted to give a full scale reading as illustrated by bar 60. Bars 74, 76, and 78 record the percentage of the total area under curves 24, 26, and 28 contained in each curve respectively.

The readout circuit described is amenable to a number of variations which do not depart from the basic invention as described above. As an example automatic standardization may be incorporated into the circuit by the use of an additional servo motor in the circuit. The servo amplifier in the computer then compares the voltage across the series combination of readout potentiometers 36, 38, etc. with a reference voltage equal to the full scale reading of the recorder. An additional servo motor drives potentiometer 46 until the voltage difference is zero, thus accomplishing standardization.

The selector switch 42 may also be incorporated into the computer by changing the computer function switch to a three position switch and adding additional elements for five poles.

Further, the complete integrator readout circuit may be incorporated in an overall chromatographic programming system. By use of suitable motor-operated timing switches in place of push button 50 and switch 42, the integrator readout system of the present invention may be employed for continuous analysis systems.

While the above description has been restricted to the use of the system of the present invention in conjunction with chromatographic analysis, the invention is not so limited and may be employed in any application where it is desired to record resistance-stored integration values as percentage values.

What is claimed is:

A method for recording individual resistance-stored integrated values as proportions of the sum of all of values which comprises connecting said individual resistances proportional to each said value in electrical series relationship, applying a fixed voltage across the series combination of said individual resistances, measuring and recording the total voltage drop across said combination of individual resistances, measuring and recording the individual voltage drop across at least one of said individual electrical resistances, said individual voltage drops being proportional to the corresponding stored integrated values as ratios of said total voltage drop.

References Cited in the file of this patent
UNITED STATES PATENTS

| | | |
|---|---|---|
| 2,178,314 | Saxe | Oct. 31, 1939 |
| 2,697,203 | Shepard | Dec. 14, 1954 |